United States Patent
Miskovic et al.

(12)

(10) Patent No.: US 6,429,255 B1
(45) Date of Patent: *Aug. 6, 2002

(54) ADHESIVE COMPOSITIONS BASED ON POLYURETHANE AND ON POLYAMINE SUSPENSION, PROCESS OF PREPARATION AND USE

(75) Inventors: Michel Miskovic, Compiegne; Bruno Charriere, Clairoix; Jean-Yves Chenard, Pau; Gerard Guilpain, Rueil Malmaison, all of (FR)

(73) Assignee: ATO Findley, S.A., Puteaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/483,456

(22) Filed: Sep. 10, 1999

Related U.S. Application Data

(63) Continuation of application No. 08/942,637, filed on Oct. 2, 1997, now Pat. No. 5,955,533.

(30) Foreign Application Priority Data

Oct. 2, 1996 (FR) .............................. 96 12008

(51) Int. Cl.[7] .............................. C08J 3/00; C08K 3/20; C08L 75/00; C08G 18/00; C08G 18/10
(52) U.S. Cl. ................ 524/590; 156/331.4; 156/331.7; 524/589; 528/44; 528/60; 528/61; 528/64
(58) Field of Search ............................... 524/589, 590; 156/331.4, 331.7; 528/44, 60, 61, 64

(56) References Cited

U.S. PATENT DOCUMENTS 4,663,415 A    5/1987  Grogler et al. ............... 528/61
5,955,533 A  * 9/1999  Miskovic et al. ........... 524/590

FOREIGN PATENT DOCUMENTS

| EP | 0 171 015     | 7/1985  | .................... 18/32 |
| EP | 0 171 015 A2  | 7/1985  | .................... 18/32 |
| EP | 0 171 015 B1  | 3/1991  | .................... 18/32 |
| EP | 0 547 379 A3  | 11/1992 | .................... 18/32 |
| EP | 0 547 379 A2  | 11/1992 | .................... 18/32 |
| EP | 0 547 379 A2  | 6/1993  |                            |
| EP | 0 547 379 A3  | 6/1993  |                            |
| JP | 7-108121      | 6/1982  | .................... 18/32 |
| JP | 57-108121     | 7/1982  |                            |
| JP | 5-32948       | 2/1993  |                            |
| JP | 5-32948       | 9/1993  | .................... 175/4 |
| JP | 7-173243      | 7/1995  |                            |
| JP | 7-173243      | 11/1995 | .................... 18/32 |

OTHER PUBLICATIONS

French Search Report dated Jun. 5, 1997.

* cited by examiner

*Primary Examiner*—Patrick D. Niland
(74) *Attorney, Agent, or Firm*—Smith, Gambrell & Russell, LLP.

(57) ABSTRACT

Adhesive compositions based on polyurethane and a polyamine suspension have a free isocyanate functional group content of between 2 and 9% by weight, with the polyamine being in the form of particles having a mean diameter of between 30 and 60 μm. A process for preparing the adhesive compositions involves reacting a polyol and a polyisocyanate to form a polyurethane prepolymer, wherein the prepolymer is mixed with the polyamine suspension. The adhesive compositions can be used for the adhesive bonding of materials, especially for motor vehicles.

11 Claims, No Drawings

ADHESIVE COMPOSITIONS BASED ON POLYURETHANE AND ON POLYAMINE SUSPENSION, PROCESS OF PREPARATION AND USE

This application is a continuation of application Ser. No. 08/942,637, filed Oct. 2, 1997 now U.S. Pat. No. 5,955,533.

FIELD OF THE INVENTION

The present invention relates to adhesive compositions based on polyurethane including a polyamine suspension. It also relates to a process of preparation and to their use, especially for the adhesive bonding of materials intended for motor vehicles.

BACKGROUND OF THE INVENTION

In industry, especially the motor vehicle industry, it is often necessary to assemble all kinds of components by adhesive bonding by means of adhesive compositions, in particular heat-curable ones.

Industrial bonding must meet a number of criteria. On the one hand, it must be quick because it is intended to be used on assembly lines at a high rate, not exceeding 5 minutes in most cases. On the other hand, the adhesive bonding must be carried out at moderate temperature, of the order of 120° C. to avoid a distortion of the components which, in general, are based on plastics.

Finally, the adhesive bonding ideally requires a "ready-for-use" adhesive composition (or single-component composition) which, furthermore, is stable for at least 1 month at a temperature lower than 25° C.

Heat-curable adhesive compositions are known where adhesive bonding is concerned.

Patent Applications JP-A-071 73243 and EP-A-171 015 describe crosslinkable compositions with delayed reactivity which contain isocyanates and/or urethane prepolymers and amines partially deactivated by means of mono- or polyisocyanates.

JP-A-57 108121 describes a urethane resin intended for the preparation of moulded articles which includes a fine powder of a crosslinking agent such as dodecanediamine.

JP-A-05 032948 proposes a sealing composition based on a polyurethane which has at least one NCO functional group and on a polyamine which has at least two $NH_2$ functional groups, dispersed in a solvent such as liquid paraffin. The solubility of the amine must remain lower than 5 g per 100 g of solution.

It has now been found that the addition of a suspension of polyamine particles of determined size to compositions based on polyurethanes enables their thermal curing to be controlled. The compositions thus obtained exhibit good adhesiveness and storage stability properties.

DESCRIPTION OF THE INVENTION

The subject-matter of the present invention is therefore compositions based on polyurethane prepolymer and on a polyamine suspension, which compositions are characterized in that the free isocyanate functional group content of the polyurethane prepolymer is between 2 and 9% by weight and the polyamine is in the form of particles of mean diameter between 30 and 60 μm.

More particularly, the compositions according to the invention include polyamine particles whose mean diameter is between 40 and 50 μm and, better still, an isocyanate functional group content of between 3 and 8% by weight.

Another subject-matter of the invention relates to a process for the preparation of the said compositions, which consists in reacting at least one polyol and at least one polyisocyanate to form a polyurethane prepolymer which has a free isocyanate functional group content of between 2 and 9% by weight, and mixing the said prepolymer with a suspension of a polyamine whose mean particle diameter is between 30 and 60 μm.

Another subject-matter of the invention relates to the use of the said compositions for the adhesive bonding of materials especially intended for motor vehicles.

The compositions according to the invention are prepared according to the process described in detail as follows:

In a first step at least one polyol is reacted with at least one polyisocyanate to form a prepolymer with isocyanate ends, whose NCO content is between 2 and 9% by weight.

The polyol is generally chosen from polyols which have a functionality higher than or equal to 2, for example polyols of polydiene type, such as polybutadiene and polyisoprene, polyols of polyester type, such as polycaprolactonepolyols, polyols of polyether type, such as polyoxyoxyethylene, polyoxypropylene and polyoxytetramethylene, and mixtures of one or more of these compounds.

Polyols of polyester or polyether type are preferably employed.

The polyisocyanate is generally chosen from aromatic polyisocyanates such as 2,4- or 4,4'-diphenylmethane diisocyanate (MDI) and tolylene diisocyanate (TDI), aliphatic polyisocyanates such as hexamethylene diisocyanate (HMDI), alicyclic polyisocyanates such as isophorone diisocyanate (IPDI), modified polyisocyanates, for example obtained by reaction with trimethylolpropane or water or by cyclization, as well as the mixtures of one or more of these compounds.

Aromatic polyisocyanates and more particularly MDI are preferably employed.

The reaction between the polyol and the polyisocyanate is generally performed at a temperature of between 60 and 110° C., preferably 70 and 90° C. and for period which varies from 2 to 10 hours, preferably 3 to 5 hours.

The ratio of the number of isocyanate functional groups to the number of hydroxyl functional groups is generally between 1.5 and 3.6 and preferably 2 and 3.

At the end of the reaction a prepolymer is recovered in which the isocyanate functional group content is between 2 and 9% by weight and preferably 3 and 8%.

In a second stage the said prepolymer is mixed with a polyamine suspension in which the mean particle diameter is between 30 and 60 μm and preferably between 40 and 50 μm.

The polyamine is generally chosen from amines containing at least two primary and/or secondary amine functional groups.

The polyamine has a melting point which is advantageously between 50 and 80° C. and, better still, between 55 and 70° C. 1,12-Dodecanediamine and 4,4'-diaminodiphenylmethane are preferably employed.

The polyamine suspension is generally used in a proportion of 40 to 55% by weight of polyamine in a liquid, and preferably in a proportion of 48 to 52% by weight.

"Liquid" is here intended to mean any compound or mixture of compounds that are liquid at a temperature of the order of 25° C. and which is not capable of reacting with the free isocyanate functional groups of the abovementioned prepolymer.

The said liquid advantageously has a low ability to solubilize the polyamine.

Examples of such liquids which may be mentioned are the paraffins, polybutadienes, phthalates such as diisooctyl phthalate or di(ethylhexyl) phthalate, and various mixtures based, for example, on isomers of dibenzyltoluene (Jarytherm DBT; Elf Atochem S.A.), on mono- and bis (xylyl)xylene (Jarysol XX; Elf Atochem S.A.), on tetramethylene glycol di-2-hexanoate (Flexol 4GO; Union Carbide) or on phthalates (Santicizer 97 or 128; Monsanto).

At the stage of mixing the prepolymer and the polyamine suspension, the ratio of the number of amine functional groups to the number of isocyanate functional groups is generally between 0.8 and 1.2 and preferably 0.9 and 1.1.

Various additives may be optionally added to the constituents of the abovementioned mixture, such as optionally stearate-treated fillers, for example calcium carbonate, barium sulphate or talc, catalysts, for example tertiary amines such as triethylamine, triethylenediamine or bis (dimethylmorpholino)ethyl ether, metal compounds such as tin or bismuth salts and molecular sieves, preferably 3 or 4 Å.

The mixing of the prepolymer, of the polyamine suspension and optionally of the additives is generally performed at a temperature of between 15 and 30° C., preferably 20 and 25° C. and for a sufficient period to obtain a homogeneous mixture.

At the end of the mixing stage a composition is recovered which crosslinks in less than 5 minutes at a temperature lower than 120° C.

Such a composition retains its adhesive properties in the course of time. It can advantageously be employed for the adhesive bonding of materials based on wood, metal or plastics optionally filled with inorganic and/or organic reinforcing agents. Polyester filled with glass fibres may be mentioned by way of example of such materials.

EXAMPLES

The examples which follow make it possible to illustrate the invention.

In the examples the shear-tensile strength is measured by the method which consists in applying a parallelepipedal joint (2.5 cm×1.5 cm; thickness: 2 mm) of adhesive between two supports made of polyester filled with glass fibres, degreased beforehand by means of methyl ethyl ketone and subjecting the whole to 140° C. for 2 to 10 minutes.

After return to the ambient temperature, the test piece thus obtained is subjected to a shear-tensile stress with a tensometer (10 mm/min).

The adhesive/support bond is characterized by the stress expressed in MPa and the type of rupture; adhesive (AR), cohesive (CR) or with delamination of the support (DEL). When more than one type of rupture occurs, the value is indicated as percentage area of each of the types of rupture. It is specified that the ruptures with delamination of the support are the desired ruptures.

Example 1

Into a reactor equipped with a stirring device are introduced 40 parts by weight of polyetherpolyol (f=3; $\overline{M}n$=4700; Voranol CP4755; Dow), 18 parts by weight of polyetherpolyol (f=3; $\overline{M}n$=3000; Voranol CP3131: Dow), 8 parts by weight of polycaprolactonepolyol (f=3; Tone 0305; Union Carbide) and 34 parts by weight of 4,4'-diphenylmethane diisocyanate (Isonate M125; Dow).

After 4 hours at 75–80° C. a prepolymer is obtained containing 7.6% by weight of free isocyanate functional groups, a ratio of the number of functional groups NCO/OH equal to 3.03 and a Brookfield viscosity at 23° C. equal to 40,000 mPa s.

Into a mixer maintained at 20° C. are introduced (in parts by weight):

| | |
|---|---|
| abovementioned prepolymer | 100 |
| bis(dimethylmorpholino)ethyl ether (Texaco) | 0.03 |
| dibutyltin dilaurate (Fluka) | 0.46 |
| molecular sieve (SA 1720; Ceca S.A.) | 30 |
| calcium carbonate | 53 |
| 1,12-dodecanediamine* | 38.5 |

*The 1,12-dodecanediamine employed is a suspension containing 50 parts by weight of a 1,12-dodecanediamine powder (mean particle diameter = 50 μm), 50 parts by weight of a polybutadiene-based suspension liquid (Polyoil 130, Hüls) and 5 parts by weight of molecular sieve (SA 1720; Ceca S.A.).

After 90 minutes an adhesive is recovered whose shear-tensile strength is measured (Table 1).

Example 2

The procedure follows the conditions of Example 1, modified in that 42.35 parts by weight of 1,12-dodecanediamine are employed.

The measurements of shear-tensile strength are presented in Table 1.

Example 3

The procedure follows the conditions of Example 1 in the presence of 1,12-dodecanediamine whose mean grain diameter is between 150 and 200 μm.

The measurements of shear-tensile strength are presented in Table 1.

TABLE 1

| | CROSSLINKING TIME (minutes) | | | | | | | |
|---|---|---|---|---|---|---|---|---|
| Example | 2 | 3 | 4 | 5 | 6 | 7 | 8 | 10 |
| 1 | 0.59 CR | 0.79 CR | 1.28 CR | 2.17 CR | 2.90 DEL | 3.06 DEL | — | — |
| 2 | 3.58 DEL | 3.17 DEL | 4.05 DEL | — | — | — | — | — |
| 3 comp. | — | — | 0.375 CR | — | 1.035 CR | — | 2.575 DEL | 2.78 DEL |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Adhesive compositions comprising a polyurethane prepolymer and a polyamine suspension, wherein the polyamine suspension consists essentially of polyamine particles and a liquid in which the particles are suspended, the polyamine particles have a functional group content consisting essentially of primary and/or secondary amine functional groups, the polyurethane prepolymer has a free isocyanate functional group content of between 2 and 9% by weight, the mean diameter of the polyamine particles is between 30 and 60 µm, and the liquid in said suspension is not capable of reacting with the free isocyanate functional groups of the prepolymer.

2. Process for the preparation of the compositions according to claim 1, comprising the steps of reacting at least one polyol and at least one polyisocyanate to form a polyurethane prepolymer which has a free isocyanate functional group content of between 2 and 9% by weight, and mixing said prepolymer with a suspension consisting essentially of polyamine particles having a mean particle diameter is of between 30 and 60 µm and a liquid which is not capable of reacting with the free isocyanate functional groups of the prepolymer, wherein the polyamine particles have a functional group content consisting essentially of primary and/or secondary amine functional groups.

3. Process for the preparation of adhesive compositions comprising the steps of:
   (a) reacting at least one polyol selected from the group consisting of polydiene, polyester and polyether and at least one polyisocyanate selected from the group consisting of aromatic, aliphatic, alicyclic and modified polyisocyanates to form a polyurethane prepolymer which has a free isocyanate functional group content of between 2 and 9% by weight, and
   (b) mixing said prepolymer with a polyamine suspension consisting essentially of polyamine particles and a liquid in which the particles are suspended, the polyamine being selected from amines containing at least two primary and/or secondary amine functional groups, said polyamine particles having a mean particle diameter between 30 and 60 µm and a functional group content consisting essentially of primary and/or secondary amine functional groups,
   wherein the liquid in said suspension is not capable of reacting with the free isocyanate functional groups of the prepolymer.

4. Compositions according to claim 1, wherein the mean diameter of the polyamine particles is between 40 and 50 µm.

5. Compositions according to claim 1, wherein the free isocyanate functional group content is between 3 and 8% by weight.

6. Process according to claim 2, wherein the polyol is selected from polyols including polydiene, polyester and polyether type.

7. Process according to claim 2, wherein the polyisocyanate is selected from aromatic, aliphatic, alicyclic or modified polyisocyanates.

8. Process according to claim 2, wherein the polyamine is selected from amines containing at least two primary and/or secondary amine functional groups.

9. Process according to claim 8, wherein the polyamine is 1,12-dodecanediamine or 4,4'-diaminodiphenylmethane.

10. Method for adhesive bonding of materials of plastic, wood or metal comprising bonding with the composition according to claim 1.

11. Method according to claim 10, wherein the material is polyester reinforced with glass fibers.

* * * * *